(12) United States Patent
Enokida et al.

(10) Patent No.: US 6,281,312 B1
(45) Date of Patent: Aug. 28, 2001

(54) PROCESS FOR PRODUCING FLUORINATED COPOLYMER, FLUORINATED COPOLYMER, CROSSLINKABLE COMPOSITION CONTAINING SAME AND SEALANT

(75) Inventors: Takashi Enokida; Okimasa Yamada, both of Kitaibaraki (JP)

(73) Assignee: Nippon Mektron, Ltd., Tokyo (JP)

( * ) Notice: Subject to any disclaimer, the term of this patent is extended or adjusted under 35 U.S.C. 154(b) by 0 days.

(21) Appl. No.: 09/346,506

(22) Filed: Jul. 1, 1999

(30) Foreign Application Priority Data

Dec. 25, 1998 (JP) .................................................. 10-370221

(51) Int. Cl.$^7$ .......................... C08F 214/22; C08F 214/24
(52) U.S. Cl. .......................... 526/255; 526/227; 526/242; 526/206; 526/249; 526/250; 528/397
(58) Field of Search .................................... 526/255, 206, 526/249, 250, 227

(56) References Cited

U.S. PATENT DOCUMENTS

| | | |
|---|---|---|
| 2,738,343 | 3/1956 | Dittman et al. . |
| 2,752,332 | 6/1956 | Honn . |
| 2,770,606 | 11/1956 | Teeters et al. . |
| 4,158,678 | 6/1979 | Tatemoto et al. . |
| 4,243,770 | 1/1981 | Tatemoto et al. ..................... 525/331 |
| 5,451,640 | 9/1995 | Yamashita ............................ 525/245 |

FOREIGN PATENT DOCUMENTS

| | | |
|---|---|---|
| 53-03495 | 1/1978 | (JP) . |
| 53086786 | 7/1978 | (JP) . |
| 53125491 | 11/1978 | (JP) . |
| 58206615 | 12/1983 | (JP) . |
| 59040066 | 3/1984 | (JP) . |
| 59062635 | 4/1984 | (JP) . |
| 59064342 | 4/1984 | (JP) . |
| 61266439 | 11/1986 | (JP) . |
| 07-11086 | 1/1995 | (JP) . |

Primary Examiner—Fred Zitomer
(74) Attorney, Agent, or Firm—Webb Ziesenheim Logsdon Orkin & Hanson, P.C.

(57) ABSTRACT

Vinylidene fluoride and chlorotrifluoroethylene are copolymerized in the presence of a compound represented by the general formula I:

$$I_n Br_m R \qquad (I)$$

wherein R represents a fluorohydrocarbon group, a chlorofluorohydrocarbon group, a chlorohydrocarbon group or a hydrocarbon group, and n is 0, 1 or 2 and m is 0, 1 or 2 provided that n+m≧2. This provides a process for producing a fluorinated copolymer which enables providing a fluorinated copolymer crosslinking product having mechanical properties satisfactory for practical use as sealants even if no inorganic additive is added thereto.

6 Claims, No Drawings

PROCESS FOR PRODUCING FLUORINATED COPOLYMER, FLUORINATED COPOLYMER, CROSSLINKABLE COMPOSITION CONTAINING SAME AND SEALANT

BACKGROUND OF THE INVENTION

1. Field of the Invention

The present invention relates to a process for producing a fluorinated copolymer and a fluorinated copolymer, and more particularly relates to a process for producing a fluorinated copolymer which enables providing a crosslinking product having excellent mechanical properties even if no inorganic additive is added thereto. Furthermore, the present invention relates to a crosslinkable composition containing the fluorinated copolymer and a sealant obtained by crosslinking the crosslinkable composition.

2. Prior Art

Fluorinated copolymers are polymeric materials having excellent heat and chemical resistances. In particular, fluorinated copolymer elastomers are used as materials for forming sealants such as O-rings, packings oil seals and gaskets and hoses which are required to possess heat and oil resistances.

However, the mixing of inorganic fillers such as carbon black and silica into the fluorinated copolymer elastomer has been inevitable for imparting mechanical properties such as hardness and strength and compression set resistance characteristics that are satisfactory for practical use as sealants to vulcanizates of fluorinated copolymer elastomers.

On the other hand, with respect to the sealants for use in the semiconductor industry, medical materials, food industry and the like among those required to possess heat and chemical resistances, the mixing of various inorganic additives such as an inorganic filler, an acid receptive agent, a vulcanization accelerator and a colorant thereinto is not desirable from the viewpoint that it is not desirable to contaminate products and product materials brought into contact with the sealants.

For coping with this dilemma, a process for producing a fluorinated resin which does not require crosslinking, can be easily molded and is flexible has been proposed as disclosed in Japanese Patent Laid-open Publication No. 58(1983)-206615. The "flexible fluorinated resin" described in this published specification comprises fluorinated elastomeric segments and fluorinated crystalline segments and provides molding with satisfactory mechanical properties even if no inorganic filler is added thereto. However, this fluorinated resin is thermoplastic and therefore has a drawback in that it cannot be employed at temperatures over the melting point of the crystalline segments (155 to 160° C.). Further, with respect to the particular process, the production of the fluorinated resin requires a plurality of burdensome steps such as emulsion polymerization, salting out/water washing, drying, solvent washing, drying, graft (solution) polymerization and solvent separation/drying. Thus, this process can hardly be stated as a desirable one from the viewpoint of cost.

Moreover, fluorinated thermoplastic elastomers having desirable mechanical properties are disclosed in Japanese Patent Laid-open Publication No. 53(1978)-3495 and Japanese Patent Publication No. 61(1986)-49327. However, the compression set resistance thereof which is important in the use as sealants is not on a satisfactory level at all. Further, these fluorinated thermoplastic elastomers are thermoplastic and therefore have a drawback in that the use temperature thereof is restricted by the melting point of the crystalline segments thereof.

On the other hand, for example, Japanese Patent Publication Nos. 2(1990)-36365, 5(1993)-18329 and 1(1989)-56659 and Japanese Patent Laid-open Publication No. 59(1984)-40066 describe that these fluorinated thermoplastic elastomers can be crosslinked by radiation and peroxides to thereby enable enhancing the compression set and crushing resistances although the recyclability of the fluorinated thermoplastic elastomers is sacrificed. However, without exception, the production of fluorinated thermoplastic elastomers as base materials is performed by multi-stage block polymerization, so that a cost increase as compared with the common one-stage polymerization is inevitable.

In Japanese Patent Laid-open Publication No. 7(1995)-11086, the applicant disclosed a fluorinated elastomer composition comprising a copolymer obtained by copolymerizing ethylidene fluoride and chlorotrifluoroethylene and a salicylaldimino copper complex as a crosslinking agent. Although this composition has realized desirable vulcanization rate and vulcanizate properties, it is essential for this composition to contain a metal complex as a crosslinking agent and to contain a divalent metal oxide or hydroxide as an acid receptive agent with the result that there has been a difficulty in the application thereof to the above sealants for use in the semiconductor industry, medical materials, food industry and the like, in which the addition of inorganic additives is not suitable. Further, the thus obtained fluorinated elastomer composition is not satisfactory in compression set, so that the application thereof to sealants, especially O-rings, cannot necessarily be stated as being satisfactory.

With respect to the production of vinylidene fluoride/chlorotrifluoroethylene copolymers, U.S. Pat. No. 2,752,332 includes Examples in which vinylidene fluoride and chlorotrifluoroethylene are charged together in a molar ratio of 20/80 to 30/70 and suspension polymerized at low temperature, for example, −20° C. for 18 hr in the presence of a redox initiator composed of a persulfate salt, acid sodium sulfite and a polyvalent metal salt to thereby obtain copolymers whose component ratio (vinylidene fluoride/chlorotrifluoroethylene ratio) is in the range of 24/76 to 25/75 with a yield of 14 to 27% by weight. Also, the mechanical properties of copolymer whose vinylidene fluoride/chlorotrifluoroethylene ratio is 25/75 among the above copolymers are evaluated in the '332 patent. The elongation at break thereof is extremely low to thereby render the application to sealants difficult.

Further, U.S. Pat. No. 2,770,606 discloses Examples in which vinylidene fluoride and chlorotrifluoroethylene are charged together into a reactor in a molar ratio of 50/50 to 75/25 and suspension polymerized at 25 to 35° C. in the presence of an initiator composed only of a persulfate salt or composed of a persulfate salt, acid sodium sulfite and a polyvalent metal salt to thereby obtain vinylidene fluoride/chlorotrifluoroethylene copolymers. In particular, Example 4 of the '606 patent describes that a rubbery copolymer whose vinylidene fluoride/chlorotrifluoroethylene ratio is 75/25 is obtained at a conversion of 70% by carrying out the reaction at 25 to 35° C. for 21 hr in the presence of potassium persulfate as an initiator. However, as a result of the follow-up test by the inventors, it was found that the polymerization reaction minimally proceeded at reaction temperature of 25 to 35° C. in the absence of a reducing agent. In the '606 patent, it is only described that the obtained various copolymers are available in the formation of coating solutions, and there is no description as to the properties which are important in the use as sealants, for example, physical properties such as glass transition temperature and melting point and mechanical properties of moldings.

Still further, U.S. Pat. No. 2,738,343 includes Comparative Examples in which rubbery fluorinated copolymers whose respective vinylidene fluoride/chlorotrifluoroethylene ratios are 34.4/65.6 and 56.5/43.5 are obtained. However, there is no description as to the elastomeric properties of these copolymers, and the polymerization reaction without exception requires a prolonged period of time, for example, 24 to 168 hr. Therefore, it can hardly be stated that a practical productive process is disclosed.

The inventors have conducted extensive and intensive studies with a view toward resolving these problems. As a result, it has been found that the copolymer obtained by copolymerizing vinylidene fluoride and chlorotrifluoroethylene in the presence of a specified compound of the formula $I_nBr_mR$ has excellent mechanical properties and is advantageous in that the production thereof can be effected without the need to conduct complex operations such as multi-stage block polymerization which must be carried out in the production of the above fluorinated copolymers.

The present invention has been made with a view toward solving the above problems. An object of the present invention is to provide a process for producing a fluorinated copolymer which can impart mechanical properties satisfactory for practical use as sealants even if no inorganic additive is added thereto. Further, other objects of the present invention are to provide a crosslinkable composition enabling crosslinking of this fluorinated copolymer and a crosslinked material obtained from the crosslinkable composition.

SUMMARY OF THE INVENTION

The process for producing a fluorinated copolymer according to the present invention, intended to overcome the above problems, comprises copolymerizing vinylidene fluoride and chlorotrifluoroethylene in the presence of a compound represented by the general formula I:

$$I_nBr_mR \quad (I)$$

wherein R represents a fluorohydrocarbon group, a chlorofluorohydrocarbon group, a chlorohydrocarbon group or a hydrocarbon group, and n is 0, 1 or 2 and m is 0, 1 or 2 provided that $(n+m) \geq 2$.

The fluorinated copolymer of the present invention is produced by the above process, which is rubbery at room temperature and has a melting point.

The crosslinkable composition of the present invention comprises the above fluorinated copolymer and a peroxide crosslinking agent.

The sealant of the present invention comprises a crosslinked material produced by crosslinking of the above crosslinkable composition.

DETAILED DESCRIPTION OF THE INVENTION

The process for producing a fluorinated copolymer, fluorinated copolymer produced by the process, crosslinkable composition comprising the fluorinated copolymer and sealant produced from the crosslinkable composition, according to the present invention, will be described below.

In the process of the present invention, vinylidene fluoride and chlorotrifluoroethylene; together with another copolymerizable monomer according to necessity, are copolymerized in the presence of a compound represented by the general formula $I_nBr_mR$ (wherein R represents a fluorohydrocarbon group, a chlorofluorohydrocarbon group, a chlorohydrocarbon group or a hydrocarbon group, and n is 0, 1 or 2 and m is 0, 1 or 2 provided that $n+m \geq 2$). The thus obtained fluorinated copolymer has a melting point and is rubbery at room temperature.

With respect to the composition of the thus obtained fluorinated copolymer, the molar ratio of vinylidene fluoride/chlorotrifluoroethylene is in the range of 31/69 to 85/15, preferably 40/60 to 80/20, and more preferably 60/40 to 75/25. When the molar ratio is in these ranges, the obtained fluorinated copolymer has a desirable balance of chemical resistance and rubber elasticity.

For imparting desirable properties to the fluorinated copolymer, a copolymerizable monomer, such as tetrafluoroethylene, hexafluoropropene, perfluoro(methyl vinyl ether), perfluoro(propyl vinyl ether), vinyl fluoride, ethylene or propylene, can be copolymerized with vinylidene fluoride and chlorotrifluoroethylene in an amount such that the objective of the present invention is not departed from.

Although the copolymerization reaction can be effected by any of the common polymerization methods such as the emulsion, suspension, solution and bulk polymerization methods, it is preferred to employ the emulsion polymerization method from the viewpoint of an increase of polymerization degree and a reduction of cost.

In the emulsion polymerization of a fluorinated monomer, a water soluble inorganic peroxide such as ammonium persulfate is generally used as an initiator. In the present invention, it is preferred to use $I_nBr_mR$ in combination with this water soluble inorganic peroxide such as ammonium persulfate in the copolymerization reaction. Further, use is made of an emulsifier such as ammonium perfluorooctanoate, ammonium perfluoropentanoate, ammonium perfluorononanoate or a mixture thereof. Of these, ammonium perfluorooctanoate is preferred. In the present invention, the use of the above water soluble inorganic peroxide such as ammonium persulfate in combination with reducing agents customarily employed in the emulsion polymerization is not favorable because there is the danger of inhibiting the action of the $I_nBr_mR$.

The polymerization reaction is performed under conditions such that the polymerization pressure is in the range of 0 to 10 MPa•G, preferably 0 to 5 MPa•G, and such that the polymerization temperature is in the range of 0 to 90° C., preferably 50 to 80° C. In that polymerization, an electrolyte substance having buffering activity, such as $NaHPO_4$, $NaH_2PO_4$ or $KH_2PO_4$, may be added so as to regulate the pH value of the polymerization system.

With respect to the supply of monomers to a reactor in the copolymerization reaction, it is preferred that whole amounts of the $I_nBr_mR$ compound described below, vinylidene fluoride and chlorotrifluoroethylene, together with the above other copolymerizable monomer used according to necessity, be charged together in the reactor before the initiation of polymerization. The thus obtained fluorinated copolymer is rubbery at room temperature and has a melting point.

As apparent from the above, the process for producing a fluorinated copolymer according to the present invention is performed in the presence of a compound represented by the general formula $I_nBr_mR$ which has a chain transfer activity.

In the general formula, R represents a hydrocarbon group, a fluorohydrocarbon group, a chlorohydrocarbon group or a chlorofluorohydrocarbon group.

The hydrocarbon group is, for example, selected from among saturated aliphatic hydrocarbon groups each having 2 to 10 carbon atoms, such as ethyl, propyl, butyl, pentyl, hexyl and octyl; unsaturated aliphatic hydrocarbon groups each having 2 to 10 carbon atoms, such as vinyl, propenyl, butenyl and pentenyl; saturated or unsaturated alicyclic hydrocarbon groups each having 4 to 10 carbon atoms, such as cyclobutyl and cyclohexyl; aromatic hydrocarbon groups such as phenyl; and substituted hydrocarbon groups obtained by substituting these hydrocarbon groups with, for example, an aryl group such as phenyl or an alkoxy group such as methoxy, ethoxy, propoxy, allyloxy or vinyloxy.

The fluorohydrocarbon group is, for example, selected from among groups obtained by partly or entirely substituting a hydrogen atom of the above hydrocarbon groups with fluorine.

The chlorohydrocarbon group is, for example, selected from among groups obtained by partly or entirely substituting a hydrogen atom of the above hydrocarbon groups with chlorine.

The chlorofluorohydrocarbon group is, for example, selected from among groups obtained by partly or entirely substituting a hydrogen atom of the above hydrocarbon groups with fluorine and chlorine.

In the general formula I, is 0, 1 or 2 and m is 0, 1 or 2 provided that $(n+m) \geq 2$.

Hereinafter, the compounds of the general formula wherein both of n and m are not 0 are referred to as "iodobrominated compounds". The compounds of the general formula wherein n is not 0 and m is 0 are referred to as "iodinated compounds". The compounds of the general formula wherein n is 0 and m is not 0 are referred to as "brominated compounds".

The iodobrominated compounds may have a chain structure or cyclic structure and may be aromatic.

Examples of the iodobrominated compounds having a chain structure or cyclic structure include 1-bromo-2-iodoperfluoroethane, 1-bromo-3-iodoperfluoropropane, 1-bromo-4-iodoperfluorobutane, 2-bromo-3-iodoperfluorobutane, 1-bromo-2-iodoperfluoro(2-methylpropane), monobromomonoiodoperfluorocyclobutane, monobromomonoiodoperfluoropentane, monobromomonoiodoperfluoro-n-octane, monobromomonoiodoperfluorocyclohexane, 1-bromo-1-iodo-2-chloroperfluoroethane, 1-bromo-2-iodo-2-chloroperfluoroethane, 1-iodo-2-bromo-2-chloroperfluoroethane, 1,1-dibromo-2-iodoperfluoroethane, 1,2-dibromo-2-iodoperfluoroethane, 1,2-diiodo-2-bromoperfluoroethane, 1-bromo-2-iodo-1,2,2-trifluoroethane, 1-iodo-2-bromo-1,2,2-trifluoroethane, 1-bromo-2-iodo-1,1-difluoroethane, 1-iodo-2-bromo-1,1-difluoroethane, 1-bromo-2-iodo-1-fluoroethane, 1-iodo-2-bromo-1-fluoroethane, 1-bromo-2-iodo-1,1,3,3,3-pentafluoropropane, 1-iodo-2-bromo-1,1,3,3,3-pentafluoropropane, 1-bromo-2-iodo-3,3,4,4,4-pentafluorobutane, 1-iodo-2-bromo-3,3,4,4,4-pentafluorobutane, 1,4-dibromo-2-iodoperfluorobutane, 2,4-dibromo-1-iodoperfluorobutane, 1,4-diiodo-2-bromoperfluorobutane, 1,4-dibromo-2-iodo-3,3,4,4-tetrafluorobutane, 1,4-diiodo-2-bromo-3,3,4,4-tetrafluorobutane, 1,1-dibromo-2,4-diiodoperfluorobutane, 1-bromo-2-iodo-1-chloroethane, 1-iodo-2-bromo-1-chloroethane, 1-bromo-2-iodo-2-chloroethane, 1-bromo-2-iodo-1,1-dichloroethane, 1,3-dibromo-2-iodoperfluoropropane, 2,3-dibromo-2-iodoperfluoropropane, 1,3-diiodo-2-bromoperfluoropropane, 1-bromo-2-iodoethane, 1-bromo-2-iodopropane, 1-iodo-2-bromopropane, 1-bromo-2-iodobutane, 1-iodo-2-bromobutane, 1-bromo-2-iodo-2-trifluoromethyl-3,3,3-trifluoropropane, 1-iodo-2-bromo-2-trifluoromethyl-3,3,3-trifluoropropane, 1-bromo-2-iodo-2-phenylperfluoroethane, 1-iodo-2-bromo-2-phenylperfluoroethane, 3-bromo-4-iodoperfluorobutene-1, 3-iodo-4-bromoperfluorobutene-1, 1-bromo-4-iodoperfluorobutene-1, 1-iodo-4-bromoperfluorobutene-1, 3-bromo-4-iodo-3,4,4-trifluorobutene-1, 4-bromo-3-iodo-3,4,4-trifluorobutene-1, 3-bromo-4-iodo-1,1,2-trifluorobutene-1, 4-bromo-5-iodoperfluoropentene-1, 4-iodo-5-bromoperfluoropentene-1, 4-bromo-5-iodo-1,1,2-trifluoropentene-1, 4-iodo-5-bromo-1,2,2-trifluoropentene-1, 1-bromo-2-iodoperfluoroethyl perfluoromethyl ether, 1-bromo-2-iodoperfluoroethyl perfluoroethyl ether, 1-bromo-2-iodoperfluoroethyl perfluoropropyl ether, 2-bromo-3-iodoperfluoropropyl perfluorovinyl ether, 1-bromo-2-iodoperfluoroethyl perfluorovinyl ether, 1-bromo-2-iodoperfluoroethyl perfluoroallyl ether, 1-bromo-2-iodoperfluoroethyl methyl ether, 1-iodo-2-bromoperfluoroethyl ethyl ether, 1-iodo-2-bromoethyl ethyl ether and 1-bromo-2-iodoethyl 2'-chloroethyl ether.

These iodobrominated compounds can be produced by appropriate conventional processes. For example, monobromomonoiodofluoroolefins can be obtained by reacting fluoroolefins with iodine bromide.

Examples of suitable aromatic iodobrominated compounds include substituted benzenes such as 1-iodo-2-bromobenzene, 1-iodo-3-bromobenzene, 1-iodo-4-bromobenzene, 3,5-dibromo-1-iodobenzene, 3,5-diiodo-1-bromobenzene, 1-(2-iodoethyl)-4-(2-bromoethyl)benzene, 1-(2-iodoethyl)-3-(2-bromoethyl)benzene, 1-(2-iodoethyl)-4-(2-bromoethyl)benzene, 3,5-bis(2-bromoethyl)-1-(2-iodoethyl)benzene, 3,5-bis(2-iodoethyl)-1-(2-bromoethyl)benzene, 1-(3-iodopropyl)-2-(3-bromopropyl)benzene, 1-(3-iodopropyl)-3-(3-bromopropyl)benzene, 1-(3-iodopropyl)-4-(3-bromopropyl)benzene, 3,5-bis(3-bromopropyl)-1-(3-iodopropyl)benzene, 1-(4-iodobutyl)-3-(4-bromobutyl)benzene, 1-(4-iodobutyl)-4-(4-bromobutyl)benzene, 3,5-bis(4-iodobutyl)-1-(4-bromobutyl)benzene, 1-(2-iodoethyl)-3-(3-bromopropyl)benzene, 1-(3-iodopropyl)-3-(4-bromobutyl)benzene, 3,5-bis(3-bromopropyl)-1-(2-iodoethyl)benzene, 1-iodo-3-(2-bromoethyl)benzene, 1-iodo-3-(3-bromopropyl)benzene, 1,3-diiodo-5-(2-bromoethyl)benzene, 1,3-diiodo-5-(3-bromopropyl)benzene, 1-bromo-3-(2-iodoethyl)benzene, 1-bromo-3-(3-iodopropyl)benzene, 1,3-dibromo-5-(2-iodoethyl)benzene and 1,3-dibromo-5-(3-iodopropyl)benzene; and substituted perfluorobenzenes such as 1-iodo-2-bromoperfluorobenzene, 1-iodo-3-bromoperfluorobenzene, 1-iodo-4-bromoperfluorobenzene, 3,5-dibromo-1-iodoperfluorobenzene and 3,5-diiodo-1-bromoperfluorobenzene.

Examples of suitable iodinated compounds include 1,2-diiodoperfluoroethane, 1,3-diiodoperfluoropropane, 1,4-diiodoperfluorobutane, 1,6-diiodoperfluorohexane and 1,8-diiodoperfluorooctane. Of these, 1,4-diiodoperfluorobutane is preferred.

Examples of suitable brominated compounds include saturated aliphatic compounds each having 2 to 10 carbon atoms, such as 1,2-dibromo-1-fluoroethane, 1,2-dibromo-1,1-difluoroethane, 1,2-dibromo-1,1,2-trifluoroethane, 1,2-dibromo-1-chlorotrifluoroethane, 2,3-dibromo-1,1,1-trifluoropropane, 1,2-dibromohexafluoropropane, 1,2-dibromoperfluorobutane, 1,4-dibromoperfluorobutane, 1,4- dibromo-2-chloro-1,1,2-trifluorobutane and 1,6-dibromoperfluorohexane; unsaturated aliphatic compounds each having 2 to 10 carbon atoms, such as 2-bromo-1,1-difluoroethylene, 1,1-dibromodifluoroethylene, bromotrifluoroethylene, 2-bromo-3,3,3-trifluoropropene, 4-bromo-1,1,2-trifluorobutene-1 and 4-bromo-3-chloro-3,4,4-trifluorobutene-1; and aromatic compounds, such as 1,2-dibromo-3,5-difluorobenzene, 1,2-dibromo-4,5-difluorobenzene, 1,4-dibromo-2,5-difluorobenzene, 2,4-dibromo-1-fluorobenzene, 1,3-dibromo-5-fluorobenzene, 1,4-dibromo-2-fluorobenzene, 1,2-dibromoperfluorobenzene, 1,3-dibromoperfluorobenzene and 1,4-dibromoperfluorobenzene.

In the present invention, when use is made of any of the above iodobrominated compounds, the radical cleavage of iodine and bromine is readily realized by the action of an organic peroxide radical generator during the polymerization reaction. The reactivity of the thus formed radicals is so high that the addition/growth reaction of monomer is induced. This reaction is terminated by the abstraction of iodine and bromine from the iodobrominated compound. As a result, a fluoroelastomer having its molecular terminals bonded with iodine and bromine is provided. The iodine and bromine atoms bonded with the molecular terminals act as crosslinking sites at the time of peroxide vulcanization.

The copolymerization reaction can also be performed in the presence of the above iodobrominated compound, iodinated compound or brominated compound together with a brominated or iodinated compound having a radically polymerizable unsaturated group.

The iodinated compound having a radically polymerizable unsaturated group is, for example, iodotrifluoroethylene, 1-iodo-2,2-difluoroethylene or perfluoro(2-iodoethyl vinyl ether).

The brominated compound having a radically polymerizable unsaturated group can be, for example, selected from among 2-bromo-1,1-difluoroethylene, 1,1-dibromodifluoroethylene, bromotrifluoroethylene, 2-bromo-3,3,3-trifluoropropene, 4-bromo-1,1,2-trifluorobutene-1,4-bromo-3-chloro- 3,4,4-trifluorobutene-1 and perfluoro(2-bromoethyl vinyl ether).

Although these iodinated compounds, iodobrominated compounds and brominated compounds are used either individually or in combination, appropriation selection is determined taking into account crosslinking conditions for fluorinated copolymer, the reactivity of these compounds, etc.

Although the molecular weight of the fluorinated copolymer of the present invention is determined taking into account the processability, moldability and mechanical properties of the fluorinated copolymer, the solution viscosity $\eta_{sp}/C$ as an index for the molecular weight is preferably in the range of about 0.3 to 2.0 dl/g, more preferably 0.5 to 1.3 dl/g.

For obtaining the fluorinated copolymer having a molecular weight corresponding to the above range of solution viscosity, a chain transfer agent such as ethyl malonate, acetone or isopropanol can be used during the polymerization reaction according to necessity. However, the above iodinated compounds, iodobrominated compounds and brominated compounds themselves have chain transfer activity, so that the addition of any other chain transfer agent is not needed except for special cases.

Although the fluorinated copolymer of the present invention can be cured by any of various conventional crosslinking methods, such as the peroxide crosslinking method in which, for example, an organic peroxide is added, the polyamine crosslinking method in which use is made of a polyamine compound and the irradiation crosslinking method in which irradiation is effected by radiation, electron beams and the like, the peroxide crosslinking method can be stated as being preferable because the use of any inorganic additive is not needed and any special apparatus is not required.

Examples of the organic peroxides suitable for a peroxide vulcanization include 2,5-dimethyl-2,5-bis(tert-butylperoxy)hexane, 2,5-dimethyl-2,5-bis (tert-butylperoxy)hexyne-3, benzoyl peroxide, bis(2,4-dichlorobenzoyl) peroxide, dicumyl peroxide, di-tert-butyl peroxide, tert-butyl cumyl peroxide, tert-butylperoxybenzene, 1,1-bis(tert-butylperoxy)-3,5,5-trimethylcyclohexane, 2,5-dimethylhexane-2,5-dihydroxyperoxide, α,α'-bis(tert-butylperoxy)-p-diisopropylbenzene, 2,5-dimethyl-2,5-di(benzoylperoxy) hexane and tert-butylperoxyisopropyl carbonate.

In the peroxide vulcanization method in which these organic peroxides are employed, a polyfunctional unsaturated compound such as tri (meth) allyl isocyanurate, tri (meth)allyl cyanurate, triallyl trimellitate, N,N'-m-phenylenebismaleimide, diallyl phthalate, tris (diallylamine)-s-triazine, triallyl phosphite, 1,2-polybutadiene, ethylene glycol diacrylate or diethylene glycol diacrylate is generally used in combination therewith as a co-crosslinking agent.

In the use of the above compounds in the peroxide vulcanization system, the organic peroxide is generally added in an amount of about 0.1 to 10 parts by weight, preferably about 0.5 to 5 parts by weight, and the co-crosslinking agent is generally added in an amount of about 0.1 to 10 parts by weight, preferably about 0.5 to 5 parts by weight, per 100 parts by weight of the fluorinated copolymer.

The fluorinated copolymer of the present invention can also be blended and co-crosslinked with other peroxide crosslinkable material, such as silicone oil, silicone rubber, fluorosilicone rubber, fluorophosphagen rubber, ethylene/vinyl acetate copolymer, other ethylene/acrylic ester copolymer, ethylene/propylene (/diene) copolymer rubber, acrylonitrile/butadiene copolymer rubber and acrylic ester rubber.

The above components can be blended together by means of, for example, a roll mill, a kneader or Banbury mixer. The crosslinking of the thus obtained blend can be effected by heating the same at about 140 to 220° C. for about 2 to 60 min. Further, when secondary crosslinking is intended, it is preferably performed at about 150 to 250° C. for a period of about 1 to 50 hr in air or an inert gas such as nitrogen gas.

A sealant can be produced by forming the above crosslinkable composition into desired configuration and crosslinking the same according to, for example, the press crosslinking, oven crosslinking or steam crosslinking technique. The obtained sealant is excellent in mechanical properties such as hardness, tensile strength and compression set even if no inorganic additive is contained therein, so that it can be suitably used in the semiconductor industry, medical materials, food industry and the like.

EFFECT OF THE INVENTION

The present invention enables providing the crosslinkable fluorinated copolymer, which, even if no inorganic additive is contained therein, is excellent in not only ordinary-state properties such as hardness and tensile strength but also compression set.

Moreover, the use of the fluorinated copolymer of the present invention enables providing the sealant which can be suitably used in the semiconductor industry, medical materials, food industry and the like.

EXAMPLES

The present invention will now be illustrated in greater detail with reference to the following Examples, which in no way limit the scope of the invention.

The melting peak temperature (Tm) of the fluorinated copolymer obtained in each of the following Examples and Referential Example was measured by the use of DSC in accordance with ASTM D 3418-97. The copolymer composition of the obtained fluorinated copolymers was determined by means of F-NMR.

Each of the obtained fluorinated copolymers was blended with the following compounds, thereby obtaining fluorinated copolymer compositions. The obtained fluorinated copolymer compositions were crosslinked under the below described conditions.

Composition

| | |
|---|---|
| fluorinated copolymer | 100 parts by weight, |
| 2,5-dimethyl-2,5-di(tert-butylperoxy)hexane | 1 part by weight, and |
| triallyl isocyanurate | 2 parts by weight. |

The above components of fluorinated copolymer composition were milled by rolls, and the blend was subjected to press crosslinking (primary crosslinking) at 180° C. for 5 min and oven crosslinking (secondary crosslinking) at 200° C. for 4 hr. Thus, sheet and O-ring which is crosslinked were formed.

The following measurements of each of the obtained crosslinked products were conducted:

ODR: Vulcanization was effected at 180° C. for 10 min, and the minimum torque value ($M_L$), maximum torque value ($M_H$) and time (Tc90) required for reaching 90% of the maximum torque value were measured, by means of oscillating disc rheometer (ASTM-100 type, manufactured by Toyo Seiki Co., Ltd.).

Ordinary-state properties:

Hardness (Shore A) measured in accordance with ASTM D-2240-81,

Hardness (IRHD) measured in accordance with ASTM D-2240-81,

100% modulus measured in accordance with ASTM D-412-83,

Tensile strength measured in accordance with ASTM D-412-83, and

Elongation measured in accordance with ASTM D-412-83.

Low-temperature properties: TR test was performed in accordance with ASTM D-1329.

Compression set: measured with respect to O-ring having 3.5 mm line diameter which is compressed to 25% at 200° C. for 70 hr and at 150° C. for 70 hr.

Example 1

20 g of ammonium perfluorooctanoate, 10 g of potassium dihydrogenphosphate and 3.8 lit. of deionized water were charged into an autoclave of 10 lit. internal volume, and the internal space gas was fully replaced by nitrogen gas. Subsequently, 7.65 g of 1,4-diiodoperfluorobutane was introduced thereinto under pressure, and 720 g of vinylidene fluoride (VdF) and 540 g of chlorotrifluoroethylene (CTFE) (molar ratio: 71/29) were further introduced under pressure. The internal temperature was raised to 70° C.

Thereafter, an aqueous solution of polymerization initiator prepared by dissolving 4 g of ammonium persulfate in 120 ml of deionized water was introduced under pressure into the autoclave, and polymerization reaction was initiated. Immediately thereafter, the internal pressure of the autoclave was decreased. When the internal pressure reached 0.4 MPa•G 5 hr later, the unreacted gas within the autoclave was immediately expelled and the reaction was terminated.

The thus obtained latex was subjected to salting out with a 1% aqueous solution of calcium chloride. Drying was conducted, and 1134 g of white rubbery copolymer was obtained (yield: 90%).

Copolymer composition: VdF/CTFE=69/31 (mol %), $\eta_{sp}/C$ [1% dimethylformamide (DMF) solution at 35° C.]: 0.75 dl/g, and Tm: 137° C.

Example 2

Polymerization reaction and salting out/drying were carried out in the same manner as in Example 1, except that 3.44 g of 1-bromo-2-iodoperfluoroethane and 1.60 g of 2-bromo-1,1-difluoroethylene were used in place of 7.65 g of 1,4-diiodoperfluorobutane. As a result, 1100 g of white rubbery copolymer was obtained (yield: 87%).

Copolymer composition: VdF/CTFE=70/30 (mol %), $\eta_{sp}/C$ [1% DMF solution at 35° C.]: 0.80 dl/g, and Tm: 140° C.

Referential Example 20 g of ammonium perfluorooctanoate, 10 g of potassium dihydrogenphosphate and 3.8 lit. of deionized water were charged into an autoclave of 10 lit. internal volume, and the internal space gas was fully replaced by nitrogen gas. Subsequently, 7.65 g of 1,4-diiodoperfluorobutane was introduced thereinto under pressure, and 240 g of vinylidene fluoride (VdF) and 180 g of chlorotrifluoroethylene (CTFE) were further introduced under pressure. The internal temperature was raised to 70° C.

Thereafter, an aqueous solution of polymerization initiator prepared by dissolving 4 g of ammonium persulfate in 150 ml of water was introduced under pressure into the autoclave, and polymerization reaction was initiated.

Immediately thereafter, the operation of introducing the gas mixture of the above composition until the internal pressure reached 2.17 MPa•G under pressure was repeated until the solid content of the formed latex reached 22% by weight. When this solid content was reached, the unreacted gas within the autoclave was immediately expelled and the reaction was terminated.

The thus obtained latex was subjected to the same salting out and drying as in Example 1. As a result, 1150 g of white rubbery copolymer was obtained.

Copolymer composition: VdF/CTFE=68/32 (mol %), $\eta_{sp}/C$ [1% DMF solution at 35° C.]: 1.0 dl/g, and Tm: not detected.

Fluorinated copolymer composition was prepared from each of the fluorinated copolymers produced in Example 1, Example 2 and Referential Example in the aforementioned manner, and crosslinking/forming thereof was carried out. The properties of the resultant crosslinked products were evaluated, and the results are listed in Table 1.

TABLE 1

|  | Example 1 | Example 2 | Referential Example |
|---|---|---|---|
| [Compsn. of copolymer] | | | |
| VdF (mol %) | 69 | 70 | 68 |
| CTFE (mol %) | 31 | 30 | 32 |
| [Visc. of copolymer soln.] | | | |
| $\eta_{sp}/C$ (dl/g, DMF) | 0.75 | 0.80 | 1.00 |
| [m.p. of copolymer] | | | |
| Tm (° C.) | 137 | 140 | not detected |
| [ODR] | | | |
| $M_L$ (dN.m) | 0.9 | 1.0 | 0.7 |
| $M_H$ (dN.m) | 10.5 | 11.8 | 8.0 |
| Tc90 (min) | 1.18 | 2.00 | 1.20 |
| [Ord.-state properties] | | | |
| hardness (Shore A) (pts) | 66 | 68 | 58 |
| 100% modulus (MPa) | 1.9 | 2.1 | 1.6 |
| tensile strength (MPa) | 14.0 | 14.8 | 12.0 |
| elongation (%) | 390 | 370 | 450 |
| [Low-temp. properties] | | | |
| TR-10 (° C.) | −9.7 | −10.3 | −9.2 |
| TR-70 (° C.) | −0.5 | −2.2 | −1.2 |
| [Compression set] | | | |
| 150° C., 70 hr (%) | 21 | 19 | 34 |
| 200° C., 70 hr (%) | 41 | 38 | 58 |

As apparent from the above results of the Examples and Referential Example, as compared with the crosslinked product of fluorinated copolymer obtained in Referential Example, the crosslinked products of fluorinated copolymers obtained in Examples 1 and 2 in which whole amounts of vinylidene fluoride (VdF) and chlorotrifluoroethylene (CTFE) were simultaneously charged prior to copolymerization reaction exerted the following effects:

(1) with respect to the ordinary-state properties, favorable values of hardness and tensile strength were exhibited without the use of inorganic fillers; and (2) the compression set was markedly enhanced to a level such that the use as sealants was highly practicable.

Comparative Example 1

Polymerization reaction and salting out/drying were carried out in the same manner as in Example 1, except that 2.6 g of carbon tetrachloride having a chain transfer activity was used in place of 7.65 g of 1,4-diiodoperfluorobutane. As a result, 1130 g of white rubbery copolymer was obtained (yield: 90%).

Copolymer composition: VdF/CTFE=69/31 (mol %), $\eta_{sp}/C$ [1% DMF solution at 35° C.]: 0.83 dl/g, and Tm: 134° C.

A fluorinated copolymer composition comprising 100 parts by weight of the fluorinated copolymer thus obtained, 1 part by weight of 2,5-dimethyl-2,5-di(tert-butylperoxy)-hexane and 2 parts by weight of triallyl isocyanurate were milled by rolls.

The measurement of the ODR of the roll-milled product was carried out, but the vulcanization torque was not raised at all.

What is claimed is:

1. A process for producing a fluorinated copolymer, comprising copolymerizing vinylidene fluoride and chlorotrifluoroethylene in the presence of a compound represented by the general formula I:

$$I_nBr_mR \qquad (I)$$

wherein R represents a fluorohydrocarbon group, a chlorofluorohydrocarbon group, a chlorohydrocarbon group or a hydrocarbon group, and n is 0, 1 or 2 and m is 0, 1 or 2 provided that (n+m)≧2, and wherein whole amounts of the compound of the general formula (I), vinylidene fluoride and chlorotrifluoroethylene are charged in a reaction system prior to initiation of the copolymerization.

2. A fluorinated copolymer produced by the process of claim 1, wherein the vinylidene fluoride/chlorotrifluoroethylene have molar ratio in a range of 31/69 to 85/15 and wherein said fluorinated copolymer has rubber elasticity at room temperature and has a melting point.

3. A crosslinkable composition comprising a fluorinated copolymer produced by the process of claim 1 and a peroxide crosslinking agent.

4. A crosslinkable composition comprising a fluorinated copolymer of claim 2 and a peroxide crosslinking agent.

5. A sealant produced by crosslinking of the crosslinkable composition of claim 3.

6. A sealant produced by crosslinking of the crosslinkable composition of claim 4.

* * * * *

UNITED STATES PATENT AND TRADEMARK OFFICE
CERTIFICATE OF CORRECTION

PATENT NO. : 6,281,312 B1
DATED : August 28, 2001
INVENTOR(S) : Takashi Enokida and Okimasa Yamada Page 1 of 1

It is certified that error appears in the above-identified patent and that said Letters Patent is hereby corrected as shown below:

Column 5,
Line 25, after "general formula I," "is 0" should read -- n is 0 --.

Column 6,
Line 4, "1-brcmo-2" should read -- 1-bromo-2 --.

Signed and Sealed this

Fifth Day of March, 2002

Attest:

Attesting Officer

JAMES E. ROGAN
Director of the United States Patent and Trademark Office